United States Patent
Chan et al.

(10) Patent No.: US 9,538,421 B1
(45) Date of Patent: Jan. 3, 2017

(54) ADAPTIVE ROHC STATE TRANSITION

(71) Applicant: QUALCOMM Incorporated, San Diego, CA (US)

(72) Inventors: Chun Chung Patrick Chan, Hong Kong (HK); Tsun Sang Cheong, Hong Kong (HK); Alvin Siu-Chung Ng, Hong Kong (HK); Tak Wai Wu, Hong Kong (HK)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/750,999

(22) Filed: Jun. 25, 2015

(51) Int. Cl.
*H04W 28/06* (2009.01)
*H04L 1/16* (2006.01)

(52) U.S. Cl.
CPC ............ *H04W 28/06* (2013.01); *H04L 1/1607* (2013.01)

(58) Field of Classification Search
CPC ............................. H04W 28/06; H04L 1/1607
USPC ......................................................... 370/474
See application file for complete search history.

(56) References Cited

U.S. PATENT DOCUMENTS

| | | |
|---|---|---|
| 2013/0083702 A1 | 4/2013 | Barany et al. |
| 2013/0279516 A1 | 10/2013 | Shi |
| 2015/0009874 A1 | 1/2015 | Edara et al. |
| 2015/0049678 A1 | 2/2015 | Speight |
| 2015/0085791 A1 | 3/2015 | Baghel |

FOREIGN PATENT DOCUMENTS

| | | |
|---|---|---|
| EP | 1808995 A1 | 7/2007 |
| WO | 2013001838 A1 | 1/2013 |

OTHER PUBLICATIONS

International Search Report and Written Opinion—PCT/US2016/029239—ISA/EPO—Jul. 14, 2016.

*Primary Examiner* — Ronald B Abelson
(74) *Attorney, Agent, or Firm* — Arent Fox LLP

(57) ABSTRACT

A method, an apparatus, and a computer-readable medium for wireless communication are provided. The apparatus may be a first device. The first device operates a ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The first device determines, at a sublayer or a layer lower than the ROHC sublayer, whether the first packet has been successfully received at the second device. The first device continues operating the ROHC compressor in the first state in response to a determination that the first packet has not been successfully received at the second device.

30 Claims, 10 Drawing Sheets

ADAPTIVE ROHC STATE TRANSITION

BACKGROUND

Field

The present disclosure relates generally to communication systems, and more particularly, to techniques of adaptive state transition at a robust header compression (ROHC) compressor.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for performing adaptive ROHC state transition is provided. The method may be performed at a first device. The method includes operating a ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The method includes determining, at a sublayer or a layer lower than the ROHC sublayer, whether the first packet has been successfully received at the second device. The method further includes operating the ROHC compressor in the second state to compress the second packet to be transmitted to the second device in response to a determination that the first packet has been successfully received at the second device.

According to an example, an apparatus for performing adaptive ROHC state transition is provided. The apparatus may be a first device. The apparatus includes means for operating a ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The apparatus includes means for determining, at a sublayer or a layer lower than the ROHC sublayer, whether the first packet has been successfully received at the second device. The apparatus further includes means for operating the ROHC compressor in the second state to compress the second packet to be transmitted to the second device in response to a determination that the first packet has been successfully received at the second device.

According to an example, an apparatus for performing adaptive ROHC state transition is provided. The apparatus may be a first device. The apparatus includes a memory and at least one processor coupled to the memory. The at least one processor is configured to operate a ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The at least one processor is configured to determine, at a sublayer or a layer lower than the ROHC sublayer, whether the first packet has been successfully received at the second device. The at least one processor is configured to operate the ROHC compressor in the second state to compress the second packet to be transmitted to the second device in response to a determination that the first packet has been successfully received at the second device.

According to an example, a computer-readable medium storing computer executable code for performing adaptive ROHC state transition at a first device is provided. The code includes code for operating a ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The code includes code for determining, at a sublayer or a layer lower than the ROHC sublayer, whether the first packet has been successfully received at the second device. The code further includes code for operating the ROHC compressor in the second state to compress the second packet to be transmitted to the second device in response to a determination that the first packet has been successfully received at the second device.

To the accomplishment of the foregoing and related ends, the one or more aspects comprise the features hereinafter fully described and particularly pointed out in the claims. The following description and the annexed drawings set forth in detail certain illustrative features of the one or more

DETAILED DESCRIPTION

Figure 1:
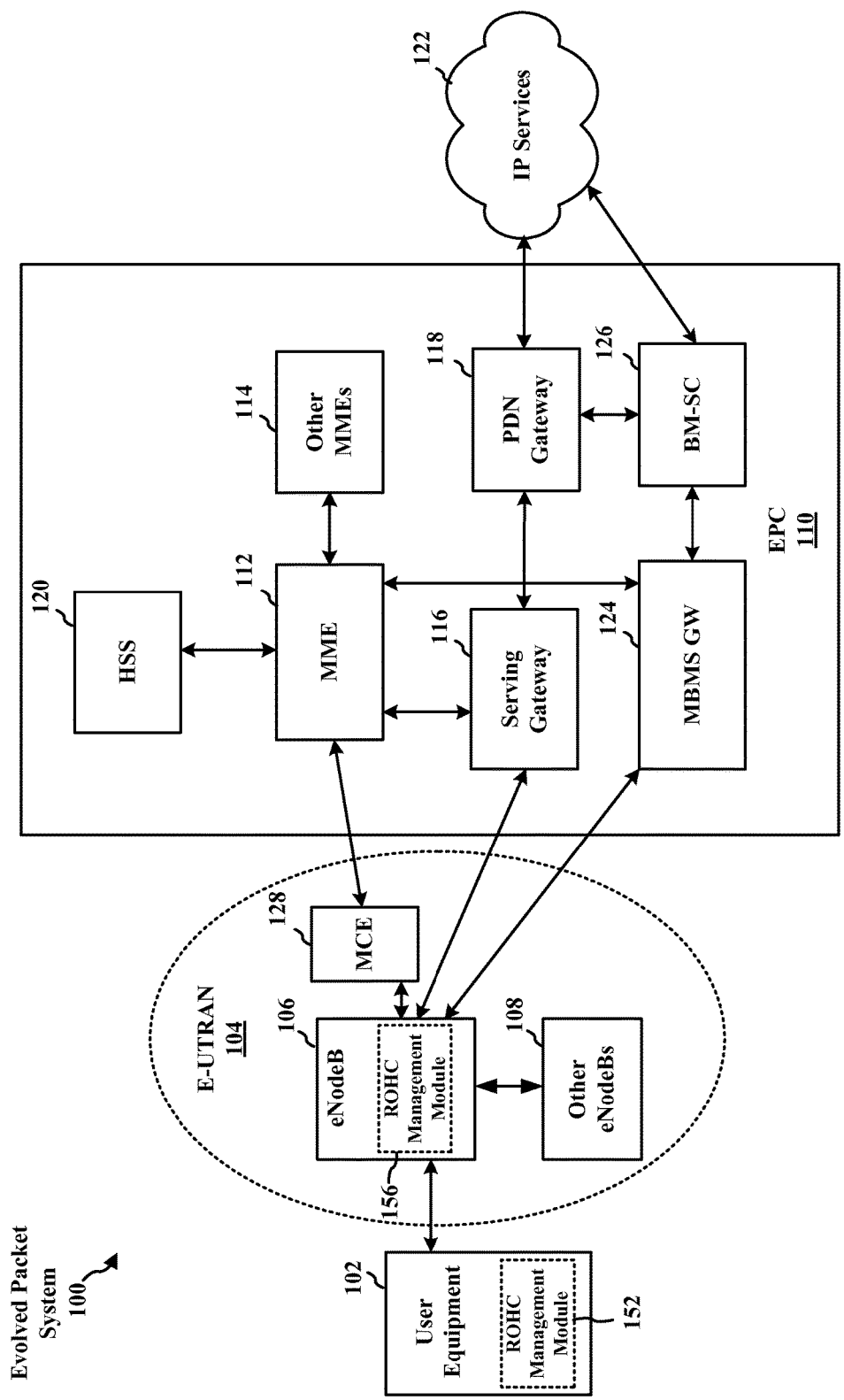
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain configurations, the UE 102 includes a ROHC management module 152 that manages a ROHC compressor. The UE 102 is a first device. In certain configurations, the ROHC management module 152 may be configured to operate the ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The ROHC management module 152 may be configured to determine, at a sublayer or a layer lower than the ROHC sublayer, whether the first packet has been successfully received at the second device. The ROHC management module 152 may be configured to operate the ROHC compressor in the second state to compress the second packet to be transmitted to the second device in response to a determination that the first packet has been successfully received at the second device. In certain configurations, the ROHC management module 152 may be configured to continue operating the ROHC compressor in the first state in response to a determination that the first packet has not been successfully received at the second device.

In certain configurations, the eNB 106 includes a ROHC management module 156 that manages a ROHC compressor. The eNB 106 is a first device. In certain configurations, the ROHC management module 156 may be configured to operate the ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The ROHC management module 156 may be configured to determine, at a sublayer or a layer lower than the ROHC sublayer, whether the first packet has been successfully received at the second device. The ROHC management module 156 may be configured to operate the ROHC compressor in the second state to compress the second packet to be transmitted to the second device in response to a determination that the first packet has been successfully received at the second device. In certain configurations, the ROHC management module 156 may be configured to continue operating the ROHC compressor in the first state in response to a determination that the first packet has not been successfully received at the second device.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
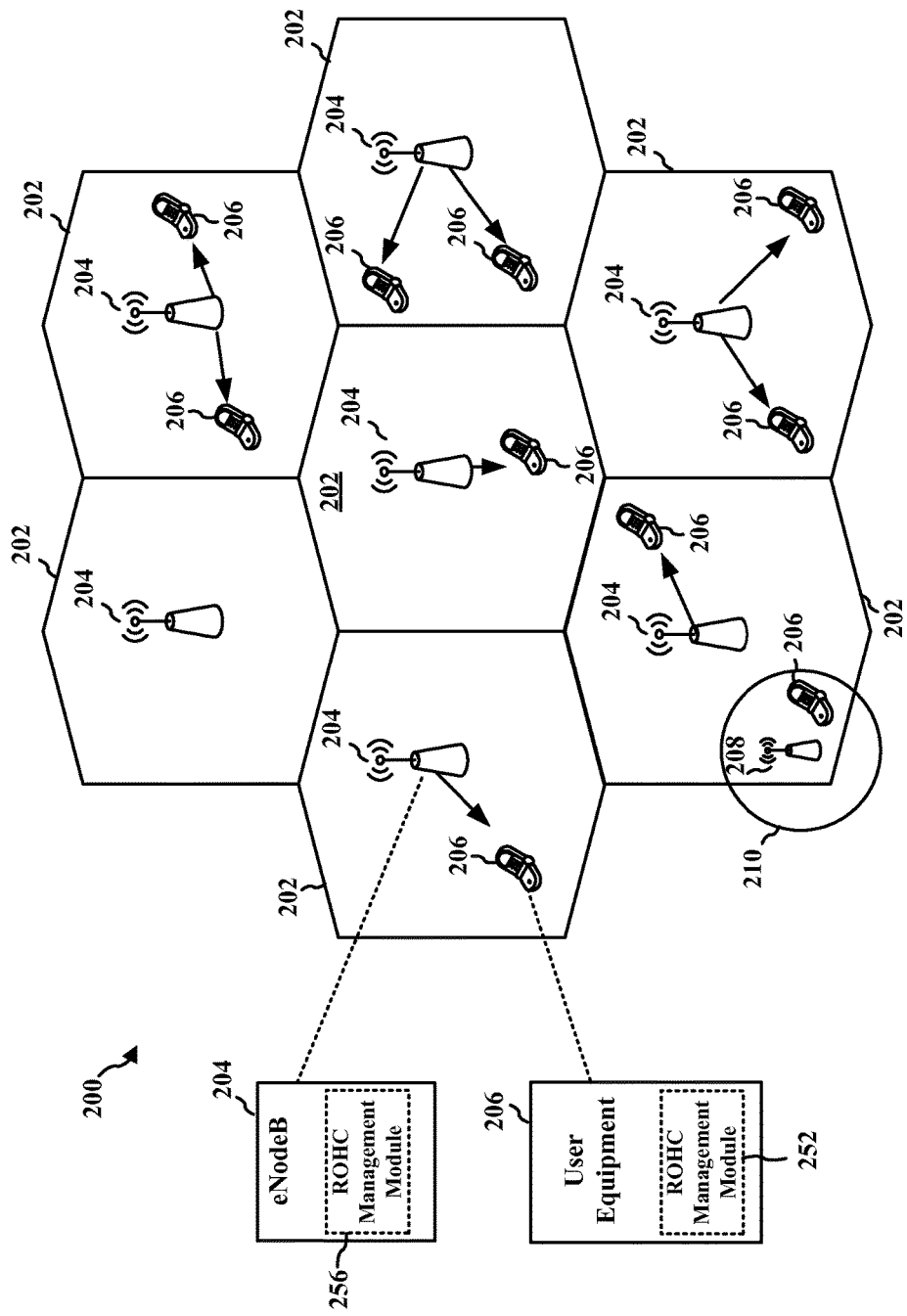
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

In certain configurations, the UE 206 includes a ROHC management module 252 that manages a ROHC compressor. The UE 206 is a first device. In certain configurations, the ROHC management module 252 may be configured to operate the ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The ROHC management module 252 may be configured to determine, at a sublayer or a layer lower than the ROHC sublayer, whether the first packet has been successfully received at the second device. The ROHC management module 252 may be configured to operate the ROHC compressor in the second state to compress the second packet to be transmitted to the second device in response to a determination that the first packet has been successfully received at the second device. In certain configurations, the ROHC management module 252 may be configured to continue operating the ROHC compressor in the first state in response to a determination that the first packet has not been successfully received at the second device.

In certain configurations, the eNB 204 includes a ROHC management module 256 that manages a ROHC compressor. The eNB 204 is a first device. In certain configurations, the ROHC management module 256 may be configured to operate the ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The ROHC management module 256 may be configured to determine, at a sublayer or a layer lower than the ROHC sublayer, whether the first packet has been successfully received at the second device. The ROHC management module 256 may be configured to operate the ROHC compressor in the second state to compress the second packet to be transmitted to the second device in response to a determination that the first packet has been successfully received at the second device. In certain configurations, the ROHC management module 256 may be configured to continue operating the ROHC compressor in the first state in response to a determination that the first packet has not been successfully received at the second device.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
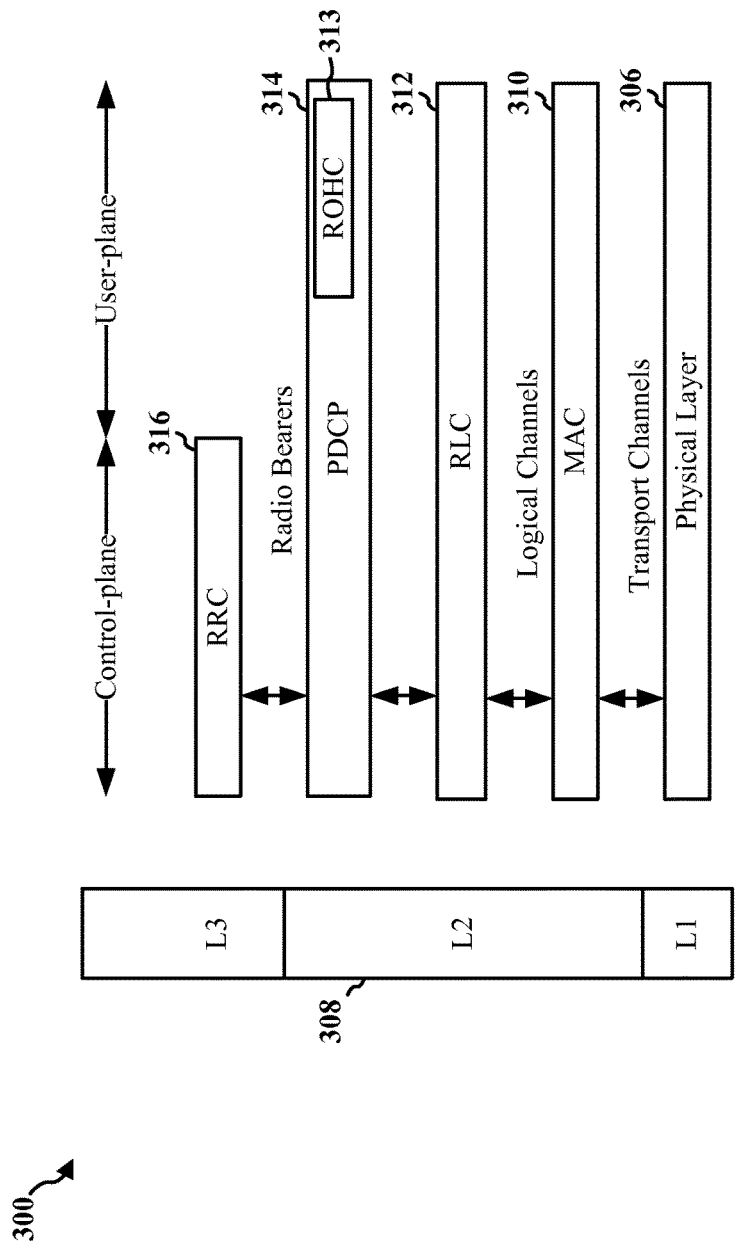
FIG. 3 is a diagram illustrating an example of a radio protocol architecture for the user and control planes.

FIG. 3 is a diagram 300 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) layer 310, a radio link control (RLC) layer 312, and a packet data convergence protocol (PDCP) layer 314, which are terminated at the eNB on the network side. Although not shown, the UE may have several upper layers above the L2 layer 308 including a network layer (e.g., IP layer) that is terminated at the PDN gateway 118 on the network side, and an application layer that is terminated at the other end of the connection (e.g., far end UE, server, etc.).

The PDCP layer 314 provides multiplexing between different radio bearers and logical channels. The PDCP layer 314 also provides header compression for upper layer data packets to reduce radio transmission overhead, security by ciphering the data packets, and handover support for UEs between eNBs. In certain configurations, the PDCP layer 314, when operating at a first device, includes a ROHC sublayer 313 that manages a ROHC compressor within the ROHC sublayer 313. In certain configurations, the ROHC sublayer 313 may be configured to operate the ROHC compressor in a first state to compress a first packet to be transmitted to a second device. The first packet includes information for a ROHC decompressor to establish a ROHC context. The information enables the ROHC decompressor to decompress a second packet compressed by the ROHC compressor when operating in a second state. The ROHC sublayer 313 may be configured to determine, at a sublayer or a layer lower than the ROHC sublayer 313 (e.g., the PDCP layer 314, RLC layer 312, the MAC layer 310, the physical (PHY) layer 306), whether the first packet has been successfully received at the second device. The ROHC sublayer 313 may be configured to operate the ROHC compressor in the second state to compress the second packet to be transmitted to the second device in response to a determination that the first packet has been successfully received at the second device. In certain configurations, the ROHC sublayer 313 may be configured to continue operating the ROHC compressor in the first state in response to a determination that the first packet has not been successfully received at the second device.

The RLC layer 312 provides segmentation and reassembly of upper layer data packets, retransmission of lost data packets, and reordering of data packets to compensate for out-of-order reception due to hybrid automatic repeat request (HARQ). The MAC layer 310 provides multiplexing between logical and transport channels. The MAC layer 310 is also responsible for allocating the various radio resources (e.g., resource blocks) in one cell among the UEs. The MAC layer 310 is also responsible for HARQ operations.

In the control plane, the radio protocol architecture for the UE and eNB is substantially the same for the physical layer 306 and the L2 layer 308 with the exception that there is no header compression function for the control plane. The control plane also includes a radio resource control (RRC) layer 316 in Layer 3 (L3 layer). The RRC layer 316 is responsible for obtaining radio resources (e.g., radio bearers) and for configuring the lower layers using RRC signaling between the eNB and the UE.

Figure 4:
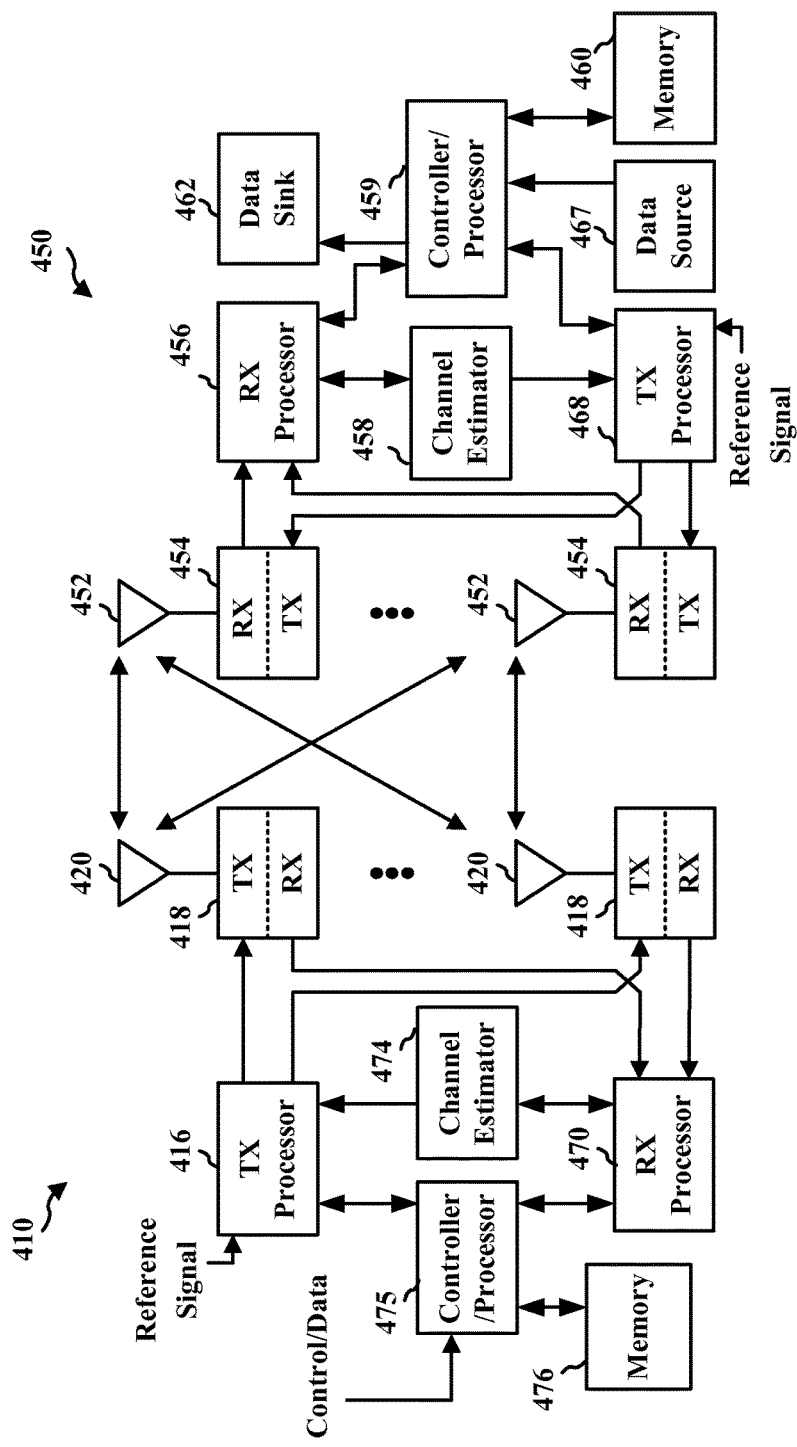
FIG. 4 is a diagram illustrating an example of an evolved Node B (eNodeB) and user equipment (UE) in an access network.

FIG. 4 is a block diagram of an eNB 410 in communication with a UE 450 in an access network. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The transmit (TX) processor 416 implements various signal processing functions for the L1 layer (i.e., physical layer). The signal processing functions include coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 410. These soft decisions may be based on channel estimates computed by the channel estimator 458. The soft decisions are then decoded and deinterleaved to recover the data and control signals that were originally transmitted by the eNB 410 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the eNB 410, the controller/processor 459 implements the L2 layer for the user plane and the control plane by providing header compression, ciphering, packet segmentation and reordering, and multiplexing between logical and transport channels based on radio resource allocations by the eNB 410. The controller/processor 459 is also responsible for HARQ operations, retransmission of lost packets, and signaling to the eNB 410.

Channel estimates derived by a channel estimator 458 from a reference signal or feedback transmitted by the eNB 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the eNB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection using an ACK and/or NACK protocol to support HARQ operations.

Figure 5:
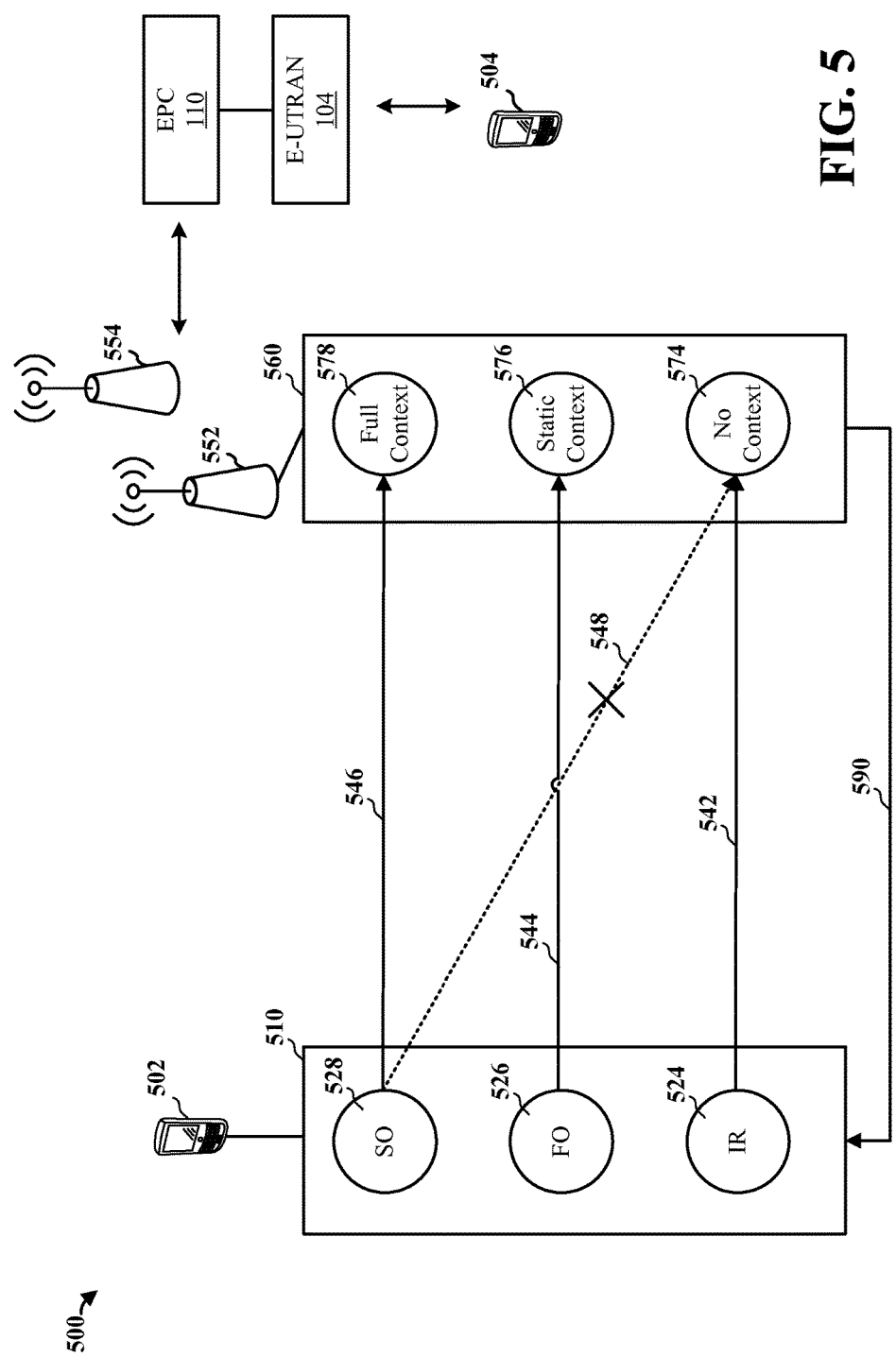
FIG. 5 is a diagram illustrating communications between a UE and an eNodeB employing ROHC.

FIG. 5 is a diagram 500 illustrating communications between a UE and an eNodeB employing ROHC. A UE 502 is in communication with an eNodeB 552 or an eNodeB 554. The UE 502 may communicate data packets with a UE 504 via the eNodeB 552 or the eNodeB 554, the EPC 110, and the E-UTRAN 104. In this example, the UE 502 wants to transmit data packets to the eNodeB 552. The UE 502 may include a ROHC compressor 510. The eNodeB 552 and the eNodeB 554 each may include a ROHC decompressor 560. As described infra in more detail, in this example, the UE 502 may employ the ROHC compressor 510 to compress packets to be transmitted to the eNodeB 552. The ROHC compressor 510 and the ROHC decompressor 560 may operate in a unidirectional mode (U-mode), a bi-directional optimistic mode (O-mode), or a bi-directional reliable mode (R-mode). In each mode, the ROHC compressor 510 may be in an initialization and refresh (IR) state 524, a first order (FO) state 526, or a second order (SO) state 528. The ROHC decompressor may operate in a no-context state 574, a static-context state 576, or a full-context state 578. The UE 502 may transmit a packet compressed by the ROHC compressor 510 to the eNodeB 552. The eNodeB 552 may employ the ROHC decompressor 560 to decompress the compressed packet received from the UE 502. Further, when a feedback channel 590 is available, the ROHC decompressor 560 may send feedback regarding the decompression performed to the ROHC compressor 510 on the feedback channel 590.

In certain configurations, the ROHC compressor 510 can compress the protocol headers of a packet, as redundancy exists in the header fields of the same packet as well as consecutive packets of the same packet stream. The ROHC compressor 510 may employ a packet classifier to identify different packet streams by the combination of parameters such as protocol headers being carried in the packet, the source and destination addresses, and the source and destination ports, etc. Initially, the ROHC compressor 510 sends to the ROHC decompressor 560 a few (e.g., 4) uncompressed packets, which are used to establish the context at both the ROHC compressor 510 and the ROHC decompressor 560. The context includes information about static fields, dynamic fields, and the change patterns of the fields in protocol headers. This information is used by the ROHC compressor 510 to efficiently compress the packet and then by the ROHC decompressor 560 to decompress the packet to the original state of the packet.

In the U-mode, packets are sent in one direction, from the ROHC compressor 510 to the ROHC decompressor 560. In cases where the feedback channel 590 is not available, the ROHC compressor 510 compresses the packets without feedback from the ROHC decompressor 560. If the feedback channel 590 is available, the feedback channel 590 may be used by the ROHC decompressor 560 to acknowledge successful decompression.

In the O-mode, the feedback channel 590 is established between the ROHC compressor 510 and the ROHC decompressor 560. The ROHC decompressor 560 can send feedback in the form of requests for error recovery (e.g., NACKs) and indication of successful context update (e.g., ACKs). The ROHC compressor 510 relies on the optimistic approach or ACKs from the ROHC decompressor 560 to move to higher states. The ROHC decompressor 560 sends ACKs for the received IR packets (i.e., packets processed by the ROHC compressor 510 in the IR state 524). For other context updating packets, the ROHC decompressor 560 may optionally send ACKs. To recover from error conditions, the ROHC decompressor 560 sends NACKs or static NACKs depending on the state of the ROHC decompressor 560.

In the R-mode, the feedback channel 590 is established between the ROHC compressor 510 and the ROHC decompressor 560 and may be used to avoid packet loss due to context invalidation. The R-mode uses the secure reference principle rather than the optimistic approach as in the other modes. In secure reference principle, confidence of the ROHC compressor 510 depends on ACKs from the ROHC decompressor 560 for every context updating packet.

As described supra, the ROHC compressor 510 may operate in 3 states: the IR state 524, the FO state 526, and the SO state 528. The states describe the increasing level of confidence about the correctness of the context at the ROHC decompressor 560. This confidence is reflected in the increasing compression of packet headers. In case of error conditions, as indicated by the ROHC decompressor 560 using feedback packets, the ROHC compressor 510 can move to a lower state to send packets that carry enough information to fix the error in the context of the ROHC decompressor 560. In some cases, the ROHC compressor 510 periodically moves to a lower state of operation to ensure the context validity at the ROHC decompressor 560.

The ROHC compressor 510 starts in the IR state 524. In this state, the ROHC compressor 510 sends uncompressed packets 542 to the ROHC decompressor 560 to establish the context at the ROHC decompressor 560. Once the ROHC compressor 510 gains the confidence that the ROHC decompressor 560 has the context information, the ROHC compressor 510 moves to higher states of operation, either via the FO state 526 to the SO state 528 or directly to the SO state 528. The ROHC compressor 510, operating in the SO state 528, sends compressed packets 546 to the ROHC decompressor 560. The ROHC compressor 510 may dynamically change its states to react to link conditions and error conditions as observed and reported by the ROHC decompressor 560.

As described supra, the ROHC decompressor 560 may operate in 3 states: the no-context state 574, the static-context state 576, and the full-context state 578. The ROHC decompressor 560 starts in the no-context state 574, as it has no context information available in the beginning of the packet flow. The successful processing of an IR packet, which contains both static and dynamic information, from the ROHC compressor 510 will create the context information at the ROHC decompressor 560. At this point, the ROHC decompressor 560 can move to the full-context state 578 to decompress SO packets (i.e., packets compressed by the ROHC compressor 510 in the SO state 528) as the ROHC decompressor 560 has received both static and dynamic information. Once in the full-context state 578, the ROHC decompressor 560 moves to lower states in error conditions. When moving to a lower state, the ROHC decompressor 560 moves to the static-context state 576. The ROHC decompressor 560 waits for compressed packets 544 sent by the ROHC compressor 510 operating in the FO state 526. The ROHC decompressor 560 can move back to the full-context state 578 by restoring the context after successfully decompressing FO packets (i.e., the compressed packets 544 compressed by the ROHC compressor 510 in the FO state 526). If the ROHC decompressor 560 still fails to decompress, it moves to the no-context state 574. In this case, the ROHC compressor 510 needs to send IR packets to restore the context at the ROHC decompressor 560.

As such, the ROHC decompressor 560 operating in the no-context state 574 may process IR packets. The ROHC decompressor 560 operating in the static-context state 576 may decompress FO packets. The ROHC decompressor 560 operating in the full-context state 578 may decompress SO packets.

In one example, the UE 502 may transmit VoLTE data to the UE 504 via the eNodeB 552, the EPC 110, and the E-UTRAN 104. The UE 502 employs the ROHC compressor 510 to compress packets carrying the VoLTE data to be transmitted to the eNodeB 552. Upon receiving the compressed packets, the eNodeB 552 may employ the ROHC decompressor 560 to decompress the compressed packets in order to obtain the VoLTE data. Further, the UE 502 may move from the cell of the eNodeB 552 to the cell of the eNodeB 554. Thus, the reception of the VoLTE data transmitted from the UE 502 may be handed over to the eNodeB 554. The eNodeB 554 similarly has a ROHC decompressor 560 that can decompress the packets compressed by the ROHC compressor 510.

The UE 502 initiates the ROHC compressor 510 in the IR state 524 of the U-mode. Due to the low efficiency nature of the IR state 524, the UE 502 may quickly switch to the SO state 528 or the FO state 526 to reach higher efficiency and larger VoLTE capacity. The duration of the ROHC compressor 510 staying in the IR state 524 depends on implementation and is adjustable depending on how confident the ROHC compressor 510 is that the ROHC decompressor 560 of the eNodeB 552 has acquired the ROHC context. If the ROHC compressor 510 stays in the IR state 524 for too long, the VoLTE capacity may be lowered. If the ROHC compressor 510 stays in the IR state 524 for too short, the VoLTE calls, which relies on the correct ROHC compression, may be dropped. For example, if the ROHC compressor 510 has already moved to the SO state 528 but the ROHC decompressor 560 of the eNodeB 552 has not established any ROHC context (i.e., the ROHC decompressor 560 is still in the no-context state 574), the SO packets subsequently sent by the UE 502 will not be correctly decompressed by the ROHC decompressor 560 at the eNodeB 552.

In certain configurations, ROHC signaling may be carried in-band in real-time transport protocol (RTP) packets carrying the VoLTE data. The RTP packets may be transported utilizing an unacknowledged mode (UM) at the RLC layer. Further, the RTP packets, packaged in PDCP packets and buffered at the PDCP layer of the UE 502, may be discarded upon PDCP discard timer expiration. In addition, the PDCP packets may be lost due to poor RF conditions. As such, the IR packets carrying the full ROHC context may be discarded at the UE 502 or lost during transmission, without ever reaching the eNodeB 552. Nonetheless, the ROHC compressor 510 at the UE 502 may optimistically assume that the ROHC decompressor 560 at the eNodeB 552 has received the IR packets and has established the full-context state 578 or the static-context state 576. Accordingly, the ROHC compressor 510 moves to the SO state 528 or the FO state 526, and the UE 502 subsequently transmits SO packets or FO packets to the eNodeB 552. As stated, the ROHC decompressor 560 may not have received the IR packets and may still in the no-context state 574. Consequently, the ROHC decompressor 560 may not be able to decompress the received compressed packets 548 (e.g., SO or FO packets). This ROHC state mismatch can lead to VoLTE call drops.

Figure 6:
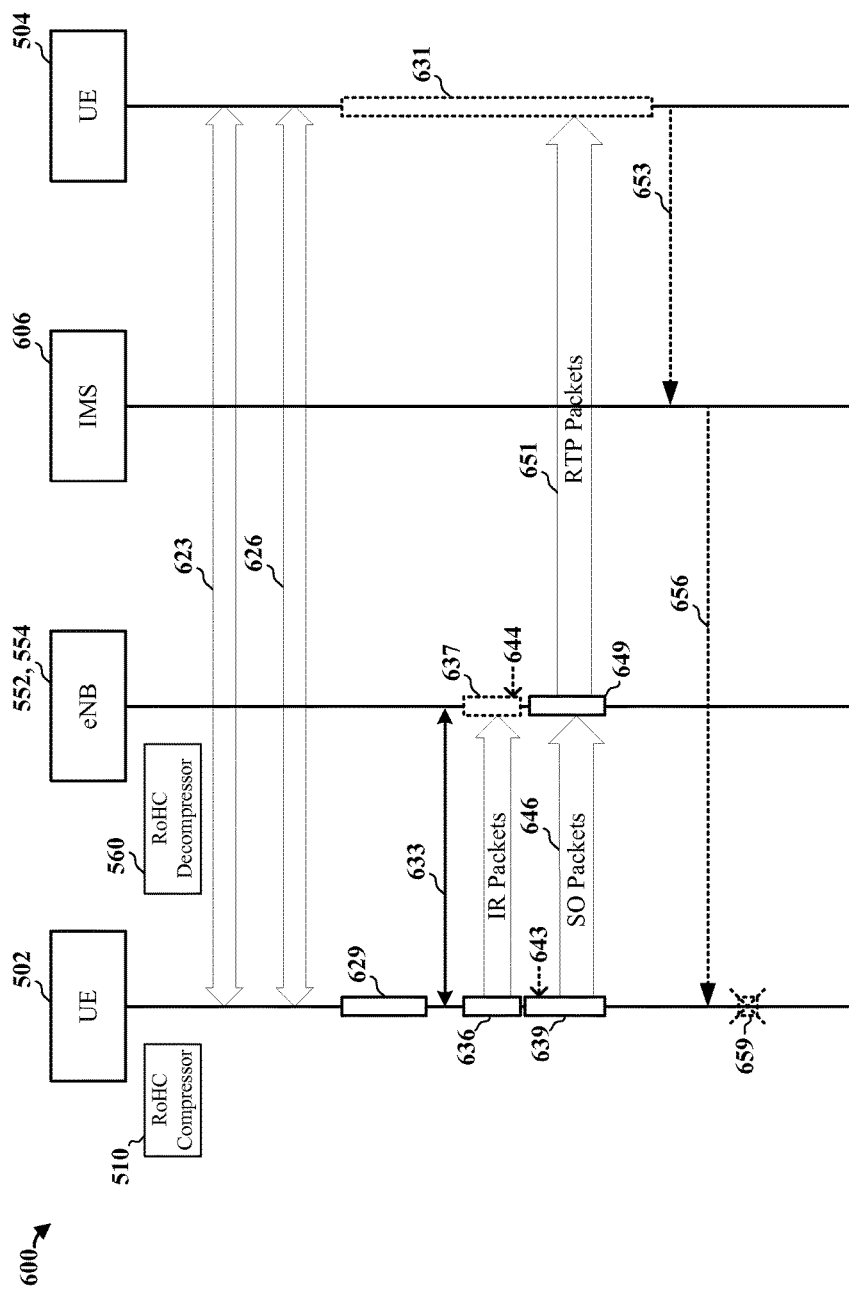
FIG. 6 is a diagram illustrating a voice over LTE (VoLTE) call between a UE and an eNodeB employing ROHC.

FIG. 6 is a diagram 600 illustrating a VoLTE call between a UE and an eNodeB employing ROHC. At operation 623, the UE 502 and the UE 504, via the eNodeB 552 and an IMS service 606, setup a VoLTE call communication. At operation 626, the UE 502 and the UE 504 may transmit RTP packets carrying the VoLTE data to each other. As described supra, after allowing the initial establishment of the ROHC context at the eNodeB 552, the ROHC compressor 510 of the UE 502 may switch to operate in the SO state 528 of the O-mode. In other words, the ROHC compressor 510, operating in the SO state 528, may compress the RTP packets carrying the VoLTE data to generate SO packets and may send the SO packets to the eNodeB 552. The ROHC decompressor 560 at the eNodeB 552, operating in the full-context state 578, can decompress the SO packets.

Subsequently, the UE 502 may move to the edge of the cell of the eNodeB 552. The UE 502 measures the cell of the eNodeB 554 and reports the measurement results to the eNodeB 552. The UE 502 may not receive any handover messages and may subsequently declare, due to high block error rate (BLER) at the downlink, a radio link failure (RLF). The RLF may result in an RLF interruption period 629 at the UE 502.

The UE 502 may choose to perform an RLF recovery procedure 633 with the eNodeB 554 (e.g., based on the previous cell measurements). At this time point, the ROHC decompressor 560 of the eNodeB 554 may not have any context for decompressing the RTP packets from the UE 502. Further, due to the RLF, the ROHC compressor 510 of the UE 502 switches to the U-mode in the IR state 524.

In one scenario, the RLF interruption period 629 and the RLF recovery procedure 633 may interrupt the transmission of the RTP packets on the user plane for a period of time (e.g., about 500 ms). On the other hand, the UE 502 may have a PDCP discard timer set at a period of time (e.g., 150 ms) shorter than the interruption and recovery time period (i.e., the RLF interruption period 629 and the time period of the RLF recovery procedure 633). An RTP packet is buffered at the PDCP layer during the interruption and recovery time period until the PDCP discard timer associated with that packet expires. When the PDCP discard timer expires, the PDCP layer may discard the buffered RTP packet.

After a successful RLF recovery procedure 633, in an IR time period 636, the ROHC compressor 510, operating in the IR state 524 of the U-mode, processes the RTP packets and buffers the processed RTP packets (i.e., IR packets) as PDCP packets at the PDCP layer. The buffered PDCP packets may be further processed sequentially at the PDCP layer and then sent to the lower layers (e.g., the MAC and physical (PHY) layers). Thus, the IR packets may be buffered for a prolonged time period at the PDCP layer as the PDCP layer may have a substantial number of packets queued to be processed after the RLF recovery procedure 633. As described supra, when the IR packets are not sent to the lower layers prior to the expiration of the associated PDCP discard timer, the IR packets may be dropped at the PDCP layer.

On the other hand, after the ROHC compressor 510 has sent a configurable number of IR packets (e.g., 4 IR packets), the ROHC compressor 510 may be configured to gain confidence to transition to the SO state 528 and to enter a SO time period 639. In this example, at time point 643, the PDCP discard timer associated with the last IR packet (e.g., the $4^{th}$ packet) sent by the ROHC compressor 510 expires, and the last IR packet (e.g., the $4^{th}$ packet) is still buffered at the PDCP layer while all prior IR packets (e.g., the $1^{st}$, $2^{nd}$, and $3^{rd}$ IR packets) have been dropped. The PDCP layer further drops the last IR packet. In other words, none of the IR packets has been transmitted by the UE 502 and received by the eNodeB 554. As the ROHC compressor 510 is optimistically confident that the eNodeB 554 should have received the IR packets and transitioned to the full-context state 578 after the IR time period 636, the ROHC compressor 510, in operation 646, transmits SO packets carrying the VoLTE data to the eNodeB 554. Accordingly, in a time period 649, the eNodeB 554 may receive SO packets but may not have any ROHC context that can be used to decompress the SO packets. Thus, the eNodeB 554 discards the SO packets received from the UE 502 in the time period 649. Further, because the ROHC compressor 510 of the UE 502 is operating in the U-mode, the ROHC compressor 510 may not have established or may not utilize the feedback channel 590 with the ROHC decompressor 560 of the eNodeB 554. Therefore, the ROHC compressor 510 may not receive feedback from the ROHC decompressor 560 that the ROHC decompressor 560 has not established the context and is not able to decompress the SO packets. Consequently, without any feedback, the ROHC compressor 510 of the UE 502 may continue generating SO packets, which are subsequently received and dropped at the ROHC decompressor 560 of the eNodeB 554.

From the start of the RLF interruption period 629, the eNodeB 554 is not be able to send VoLTE data to the UE 504 via the EPC 110 and the E-UTRAN 104. Accordingly, the UE 504 may not receive any downlink RTP packets carrying the VoLTE data. If the UE 504 does not receive any downlink RTP packets in a wait period 631 (e.g., 10 seconds), the UE 504, at operation 653, send a time out (e.g., SIP BYE) message to the IMS service 606 and terminates the VoLTE call with the UE 504. Upon receiving the time out message, the IMS service 606 accordingly sends, at operation 656, a time out message (e.g., SIP BYE) to the UE 502. Subsequently, at operation 659, the UE 502 may terminate the VoLTE call with the UE 504. As such, the mismatch of the ROHC states at the ROHC compressor 510 and the ROHC decompressor 560 may result in the VoLTE call being dropped.

Figure 7:
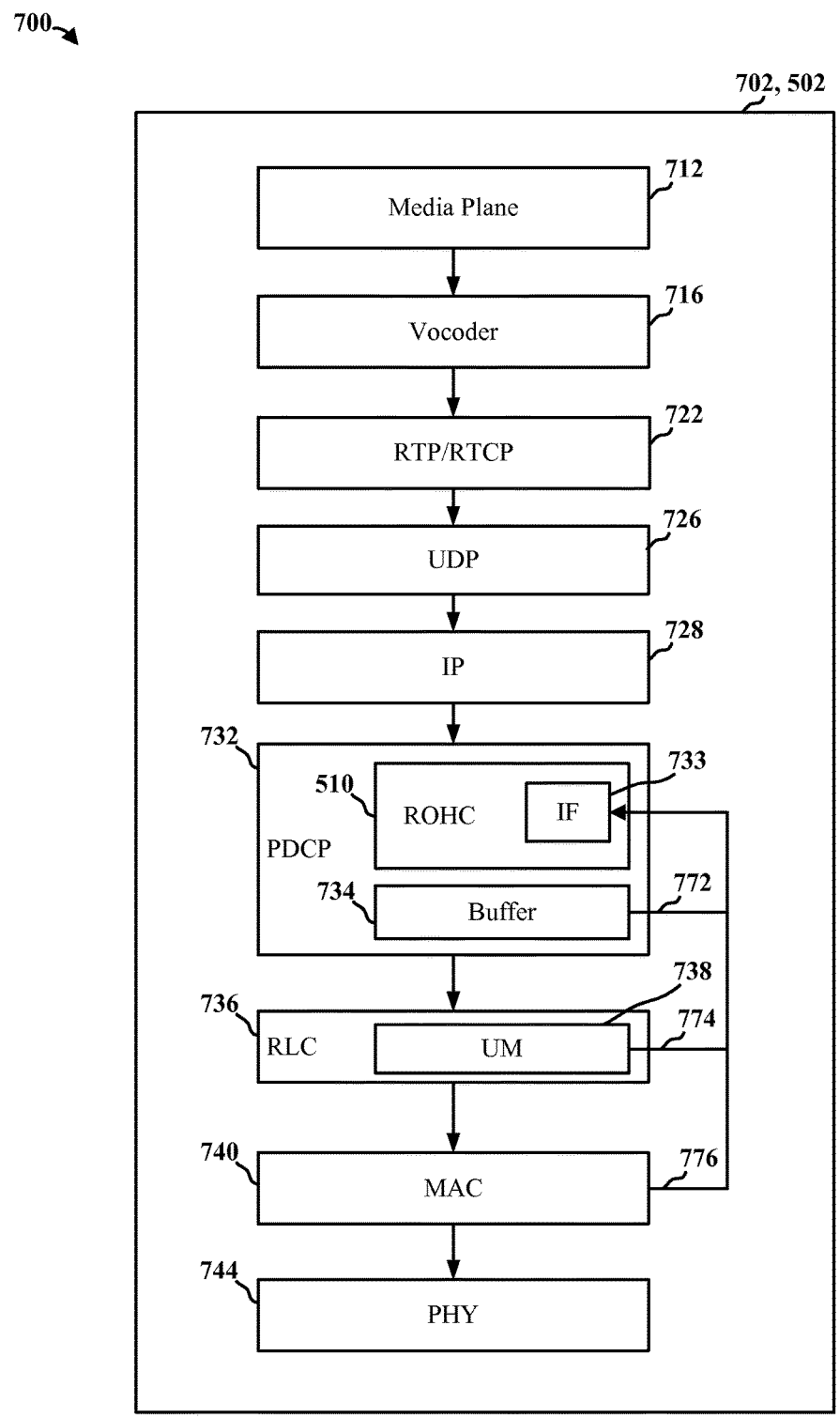
FIG. 7 is a diagram illustrating adaptive ROHC state transition operations at a device.

FIG. 7 is a diagram 700 illustrating adaptive ROHC state transition operations at a device. A device 702 has, among other components, a media plane 712, a voice encoder 716, an RTP/RTP control protocol (RTCP) layer 722, a user datagram protocol (UDP) layer 726, an IP layer 728, a PDCP layer 732, an RLC layer 736, a MAC layer 740, and a PHY layer 744. The PDCP layer 732 includes the ROHC compressor 510, which may have a compressor interface 733. The PDCP layer 732 further may include a PDCP buffer 734. The RLC layer 736 may operate in an unacknowledged mode 738 or an acknowledged mode.

In certain configurations, when the device 702 employs a ROHC sublayer (e.g., the ROHC compressor 510) to compress data packets to be transmitted to another device, the sublayers or layers below the ROHC sublayer may be configured to implement the techniques described infra to address the mismatch issues described supra. In this example, the UE 502 is used as an exemplary device 702. The UE 502 operates the ROHC compressor 510 to compress packets to be sent to the eNodeB 552 or the eNodeB 554. Accordingly, the description infra may use the PDCP layer 732, the RLC layer 736, the MAC layer 740, and the PHY layer 744 at the UE 502 as examples to describe the techniques. Nonetheless, the techniques described infra may be equally applied to the eNodeB 552 or the eNodeB 554 when the eNodeB 552 or the eNodeB 554 operates a ROHC compressor 510 to compress packets to be transmitted to the UE 502 or the UE 504. Further, the techniques described infra may use the U-mode of the ROHC compressor 510 as an example. Nonetheless, the techniques described infra may be similarly applied to the O-mode and the R-mode of the ROHC compressor 510.

Particularly, with reference to FIGS. 6 and 7, in certain configurations, the media plane 712 of the UE 502 sends the voice data to the voice encoder 716 to generate encoded voice data in the IR time period 636. In this example, the UE 502 utilizes the RTP/RTCP layer 722, the UDP layer 726, and the IP layer 728 to generate RTP packets carrying the encoded voice data. The RTP packets are then sent to the PDCP layer 732. The PDCP layer 732 includes the ROHC compressor 510 in a ROHC sublayer. As described supra, in the IR time period 636, the ROHC compressor 510, operating in the IR state 524 of the U-mode, processes the RTP packets to generate IR packets. The IR packets are packaged into PDCP protocol data units (PDUs), which may be buffered at the PDCP buffer 734. In this technique, the ROHC compressor 510 does not switch to the higher states (e.g., the SO state 528) after sending a number of IR packets (e.g., 4 IR packets) to the PDCP layer 732. Rather, the ROHC compressor 510 waits an indication from a lower layer or sublayer before transitioning to the higher states. For example, the ROHC compressor 510 may provide the compressor interface 733 through which the lower layers or sublayers can communicate with the ROHC compressor 510. The indication may indicate that the ROHC compressor 510 may transition to a higher state or that an IR packet has been correctly received at the eNodeB 554. The indication may alternatively indicate that the ROHC compressor 510 should stay in the IR state 524, as a configurable number of IR packets have not been correctly received at the eNodeB 554.

In particular, the PDCP layer 732 monitors whether any PDCP PDU containing an IR packet has been dropped at the PDCP layer 732 due to expiration of the PDCP discard timer. If one or more PDCP PDUs have been dropped at the PDCP layer 732, the PDCP layer 732 may send an indication 772 to the ROHC compressor 510 to instruct the ROHC compressor 510 to stay in the IR state 524 and to delay transitioning to the higher states, as the eNodeB 554 will not receive the IR packet contained in the PDCP PDU that has been dropped.

Further, when a PDCP PDU containing an IR packet is delivered to the RLC layer 736, the RLC layer 736 continues monitoring the handling of the PDCP PDU. In this example, the RLC layer 736 operates in the unacknowledged mode 738. The RLC layer 736 monitors whether the PDCP PDU has been packaged into an RLC PDU and then successfully delivered to the MAC layer 740. If the PDCP PDU is not delivered to the MAC layer 740 via an RLC PDU, the RLC layer 736 may send an indication 774 to the ROHC compressor 510 to instruct the ROHC compressor 510 to stay in the IR state 524 and to delay transitioning to the higher states, as the eNodeB 554 will not receive the IR packet contained in the PDCP PDU.

Further, when an RLC PDU containing an IR packet is delivered to the MAC layer 740, the MAC layer 740 continues monitoring the handling of the RLC PDU. The MAC layer 740 monitors whether the RLC PDU has been packaged into a MAC PDU (MPDU) at the MAC layer 740 and then delivered to the PHY layer 744 and whether the MPDU has been packaged into a PHY PDU (PPDU) that is to be transmitted to the eNodeB 554. Once the PPDU has been transmitted to the eNodeB 554 at the PHY layer 744, the MAC layer 740 continues monitoring the ACK or NACK received in the HARQ procedure. When the MAC layer 740 detects that the RLC PDU was not packaged into a PPDU or the PPDU was not transmitted at the PHY layer 744, or determines, e.g., based on a NACK, that the MPDU carrying an IR packet was not successfully received at the eNodeB 554, the MAC layer 740 may send an indication 776 to the ROHC compressor 510 to instruct the ROHC compressor 510 to stay in the IR state 524 and to delay transitioning to the higher states, as the eNodeB 554 did not successfully receive the IR packet via the PPDU.

When the MAC layer 740 of the UE 502 receives an ACK from the eNodeB 554 through the HARQ procedure for an MPDU carrying an IR packet, the MAC layer 740 may send an indication 776 to the ROHC compressor 510 to indicate that the IR packet has been successfully received at the eNodeB 554. Accordingly, the ROHC compressor 510 may gain more confidence that the eNodeB 554 may be able to establish the ROHC context. After the ROHC compressor 510 has received a configurable number of indications 776 (e.g., 4 indications) collectively indicating that a configurable number of IR packets (e.g., 4 IR packets) have been successfully received at the eNodeB 552, the ROHC compressor 510 may be confident to transition to a higher state (e.g., the SO state 528 or the FO state 526). Alternatively, the MAC layer 740 may send an indication 776 to the ROHC compressor 510 to indicate that the ROHC compressor 510 may transition to a higher state. In this example, at the end of the in the IR time period 636, the ROHC compressor 510 determines that the number of the IR packets have been successfully received at the eNodeB 554. Subsequently, the ROHC compressor 510 transitions to the SO state 528 and enters the SO time period 639. The ROHC compressor 510, in operation 646, transmits SO packets to the eNodeB 554.

In this example, the eNodeB 554 receives the IR packets in a time period 637. After receiving one or more IR packets, at a time point 644, the eNodeB 554 establishes full ROHC context and may operate in the full-context state 578. Subsequently, in the time period 649, the eNodeB 554 receives the SO packets carrying the RTP packets. At operation 651, the eNodeB 554 sends the RTP packets to the UE 504.

Figure 8:
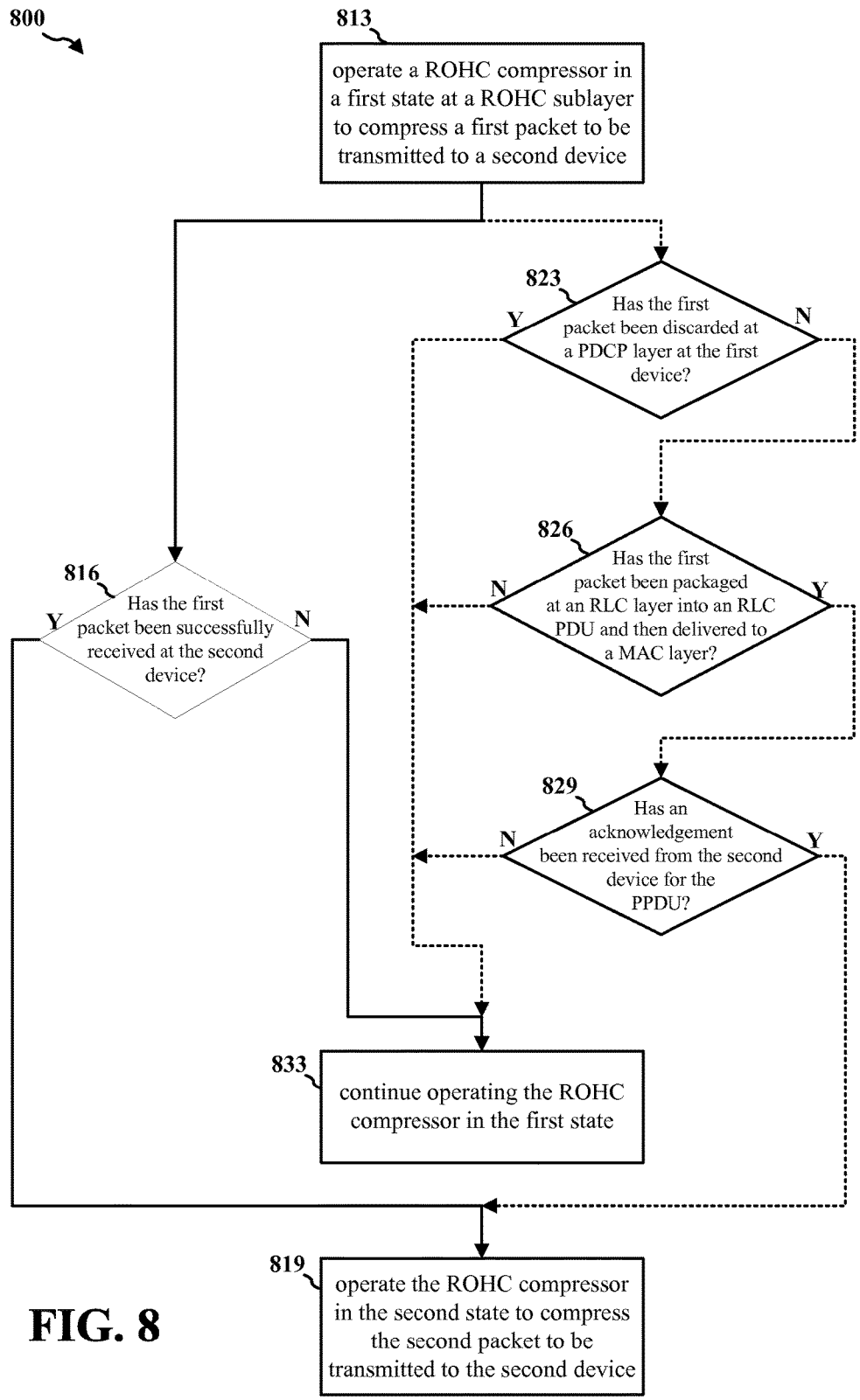
FIG. 8 is a flow chart of a method/process of adaptive ROHC state transition performed by a device.

FIG. 8 is a flow chart 800 of a method (process) of adaptive ROHC state transition performed by a first device. The first device may be a UE or a base station (e.g., the UE 502, the UE 504, the eNodeB 552, the eNodeB 554, the apparatus 902/902'). At operation 813, the first device operates a ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. In certain configurations, the ROHC compressor operates in the U-mode, the O-mode, or the R-mode. For example, referring to FIGS. 5 and 6, in the IR time period 636, the ROHC compressor 510 of the UE 502, operating in the IR state 524 of the U-mode, processes the RTP packets to generate IR packets.

At operation 816, the first device determines, at a sublayer or a layer lower than the ROHC sublayer, whether the first packet has been successfully received at the second device. When the first packet has been successfully received at the second device, the first device, at operation 819, operates the ROHC compressor in the second state to compress the second packet to be transmitted to the second device in response to a determination that the first packet has been successfully received at the second device. For example, referring to FIGS. 5 and 6, when the MAC layer 740 of the UE 502 receives an ACK from the eNodeB 554 through the HARQ procedure for an MPDU carrying an IR packet, the MAC layer 740 may send an indication to the ROHC compressor 510 to indicate that the IR packet has been successfully received at the eNodeB 554. At the end of the in the IR time period 636, the ROHC compressor 510 determines that the number of the IR packets have been successfully received at the eNodeB 554. Subsequently, the ROHC compressor 510 transitions to the SO state 528 and enters the SO time period 639.

When the first packet has not been successfully received at the second device, the first device, at operation 833, continues operating the ROHC compressor in the first state. In certain configurations, the first state is an IR state, and the second state is a FO state or a SO state. In certain configurations, the ROHC context is one of a static context or a full context.

In certain configurations, to determine whether the first packet have been successfully received at the second device, the first device, at operation 823, determines whether the first packet has been discarded at a PDCP layer at the first device. When the first packet has been discarded at the PDCP layer, the first device proceeds to operation 833. For example, referring to FIGS. 5 and 6, the PDCP layer 732 monitors whether any PDCP PDU containing an IR packet has been dropped at the PDCP layer 732 due to expiry of the PDCP discard timer. If one or more PDCP PDUs have been dropped at the PDCP layer 732, the PDCP layer 732 may send an indication to the ROHC compressor 510 to instruct the ROHC compressor 510 to stay in the IR state 524 and to delay transitioning to the higher states, as the eNodeB 554 will not receive the IR packet contained in the PDCP PDU that have been dropped.

When the first packet has not been discarded at the PDCP layer, the first device, at operation 826, determines whether the first packet has been packaged at an RLC layer into an RLC PDU and then delivered to a MAC layer. In certain configurations, the RLC layer is in an unacknowledged mode. When the first packet has not been packaged at the RLC layer into an RLC PDU and then delivered to the MAC layer, the first device proceeds to operation 833. For example, referring to FIGS. 5 and 6, the RLC layer 736 continues monitoring the handling of the PDCP PDU. The RLC layer 736 operates in the unacknowledged mode 738. The RLC layer 736 monitors whether the PDCP PDU has been packaged into an RLC PDU and then successfully delivered to the MAC layer 740. If the PDCP PDU is not delivered to the MAC layer 740 via an RLC PDU, the RLC layer 736 may send an indication to the ROHC compressor 510 to instruct the ROHC compressor 510 to stay in the IR state 524 and to delay transitioning to the higher states, as the eNodeB 554 will not receive the IR packet contained in the PDCP PDU.

When the first packet has been packaged at the RLC layer into an RLC PDU and then delivered to the MAC layer, the first device transmits, at a PHY layer, the first packet in a PPDU to the second device. Then at operation 829, the first device determines whether an acknowledgement has been received from the second device for the PPDU. When an acknowledgement has not been received from the second device for the PPDU, the first device proceeds to operation 833. When an acknowledgement has been received from the second device for the PPDU, the first device proceeds to operation 810. For example, referring to FIGS. 5 and 6, the MAC layer 740 continues monitoring the ACK or NACK received in the HARQ procedure. When the MAC layer 740 determines, e.g., based on a NACK, that the MPDU carrying an IR packet was not successfully received at the eNodeB 554, the MAC layer 740 may send an indication to the ROHC compressor 510 to instruct the ROHC compressor 510 to stay in the IR state 524 and to delay transitioning to the higher states, as the eNodeB 554 did not successfully receive the IR packet via the PPDU.

Figure 9:
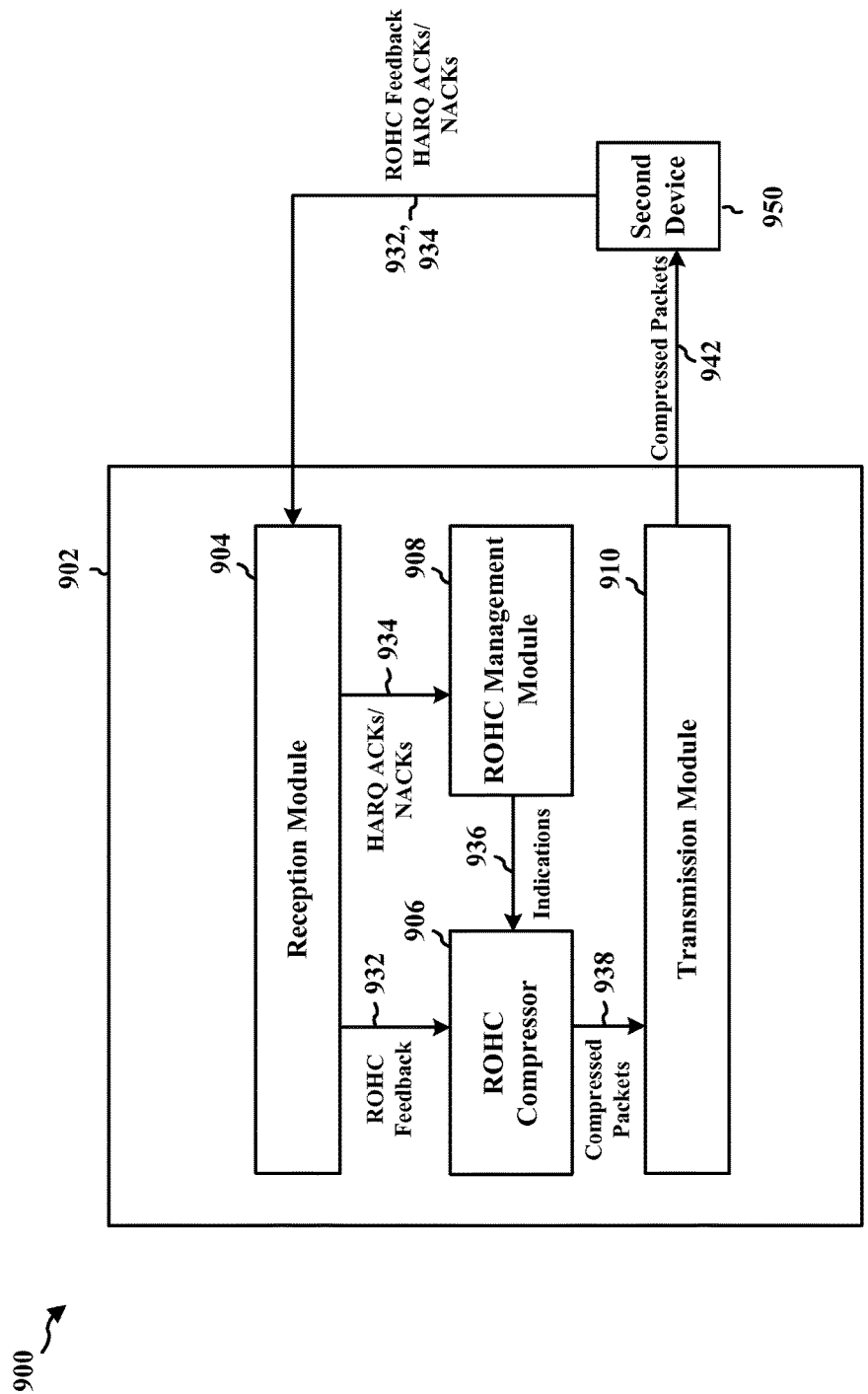
FIG. 9 is a conceptual data flow diagram illustrating a data flow between different modules/means/components in an exemplary apparatus.

FIG. 9 is a conceptual data flow diagram 900 illustrating the data flow between different modules/means/components in an exemplary apparatus 902. The apparatus may be a UE or an eNodeB. The apparatus is a first device and includes a reception module 904, a ROHC compressor 906, a ROHC management module 908, and a transmission module 910.

In certain configurations, the ROHC management module 908 may be configured to operate the ROHC compressor 906 in a first state at a ROHC sublayer to compress a first packet to be transmitted to a second device 950. The first packet includes information for a ROHC decompressor to establish a ROHC context. The information enables the ROHC decompressor to decompress a second packet compressed by the ROHC compressor 906 when operating in a second state. The ROHC management module 908 may be configured to determine, at a sublayer or a layer lower than the ROHC sublayer, whether the first packet has been successfully received at the second device 950. The ROHC management module 908 may be configured to send indications 936 regarding whether the first packet has been successfully received at the second device 950 to the ROHC compressor 906. The ROHC management module 908 may be configured to continue operating the ROHC compressor 906 in the first state in response to a determination that the first packet has not been successfully received at the second device 950. The ROHC management module 908 may be configured to operate the ROHC compressor 906 in the second state to compress the second packet to be transmitted to the second device 950 in response to a determination that the first packet has been successfully received at the second device 950. The ROHC compressor 906 may be configured to send compressed packets 938 to the transmission module 910. The transmission module 910 may be configured to transmit compressed packets 942 to the second device 950.

In certain configurations, the first state is an IR state, and the second state is a FO state or a SO state. In certain configurations, the ROHC context is one of a static context or a full context. In certain configurations, the first packet is determined to have not been successfully received at the second device 950 when the first packet has been discarded at a PDCP layer at the first device. In certain configurations, the first packet is determined to have not been successfully received at the second device 950 when the first packet has not been packaged at an RLC layer into an RLC PDU and then delivered to a MAC layer.

In certain configurations, the transmission module 910 may be configured to transmit, at a PHY layer, the first packet in a PPDU to the second device 950. The reception module 904 may be configured to receive ROHC feedback 932 and HARQ ACKs/NACKs 934 from the second device 950. The reception module 904 then may send the ROHC feedback 932 to the ROHC compressor 906 and may send the HARQ ACKs/NACKs 934 to the ROHC management module 908. The ROHC management module 908 may be configured to determine whether an acknowledgement has been received from the second device 950 for the PPDU. The first packet is determined to have not been successfully received at the second device 950 in response to a determination that an acknowledgement has not been received from the second device 950 for the PPDU. The first packet is determined to have been successfully received at the second device 950 in response to a determination that an acknowledgement has been received from the second device 950 for the PPDU.

In certain configurations, the RLC layer is in an unacknowledged mode. In certain configurations, the ROHC compressor 906 operates in a unidirectional mode, a bidirectional optimistic mode, or a bidirectional reliable mode. In certain configurations, the first device is a UE or a base station.

In certain configurations, the reception module 904 may be configured to receive ROHC feedback from the second device 950 and may be configured to send the ROHC feedback to the ROHC compressor 906.

The apparatus may include additional modules that perform each of the blocks of the algorithm in the aforementioned flowcharts of FIG. 8. As such, each block in the aforementioned flowcharts of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
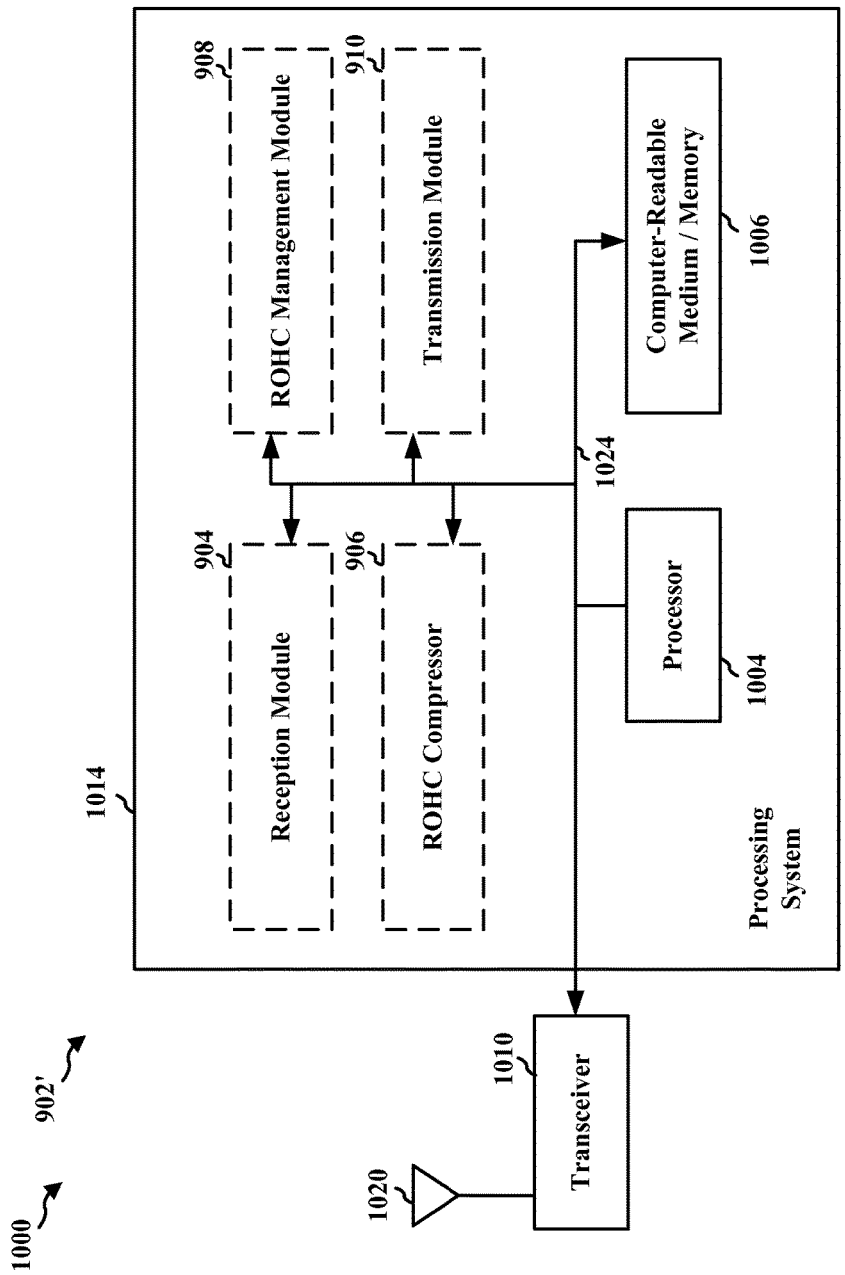
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception module 904. In addition, the transceiver 1010 receives information from the processing system 1014, specifically the transmission module 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908, and 910. The modules may be software modules running in the processor 1004, resident/stored in the computer readable medium/memory 1006, one or more hardware modules coupled to the processor 1004, or some combination thereof. Where the first device is an eNodeB, the processing system 1014 may be a component of the eNB 410 and may include the memory 476 and/or at least one of the TX processor 416, the RX processor 470, and the controller/processor 475. Where the first device is a UE, the processing system 1014 may be a component of the UE 450 and may include the memory 460 and/or at least one of the TX processor 468, the RX processor 456, and the controller/processor 459.

In one configuration, the apparatus 902/902' includes means for operating a ROHC compressor in a first state at a ROHC sublayer to compress a first packet to be transmitted to a second device. The first packet includes information for a ROHC decompressor to establish a ROHC context. The information enables the ROHC decompressor to decompress a second packet compressed by the ROHC compressor when operating in a second state. The apparatus 902/902' includes means for determining, at a sublayer or a layer lower than the ROHC sublayer, whether the first packet has been successfully received at the second device. The apparatus 902/902' includes means for operating the ROHC compressor in the second state to compress the second packet to be transmitted to the second device in response to a determination that the first packet has been successfully received at the second device.

In certain configurations, the apparatus 902/902' may be configured to include means for continuing operating the ROHC compressor in the first state in response to a determination that the first packet has not been successfully received at the second device. In certain configurations, the first state is an IR state, and the second state is a FO state or a SO state. In certain configurations, the ROHC context is one of a static context or a full context.

In certain configurations, the first packet is determined to have not been successfully received at the second device when the first packet has been discarded at a PDCP layer at the first device. In certain configurations, the first packet is determined to have not been successfully received at the second device when the first packet has not been packaged at an RLC layer into an RLC PDU and then delivered to a MAC layer.

In certain configurations, the apparatus 902/902' may be configured to include means for operating the RLC layer in an unacknowledged mode. In certain configurations, the ROHC compressor is configured to operate in a unidirectional mode, a bidirectional optimistic mode, or a bidirectional reliable mode. In certain configurations, the first device is a UE or a base station.

The aforementioned means may be one or more of the aforementioned modules of the apparatus 902 and/or the processing system 1014 of the apparatus 902' configured to perform the functions recited by the aforementioned means. Where the first device is an eNodeB, as described supra, the processing system 1014 may include the TX Processor 416, the RX Processor 470, and the controller/processor 475. As such, in one configuration, the aforementioned means may be the TX Processor 416, the RX Processor 470, and the controller/processor 475 configured to perform the functions recited by the aforementioned means. Where the first device is a UE, as described supra, the processing system 1014 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first device, comprising:
    operating a robust header compression (ROHC) compressor in a first state at a ROHC sublayer to compress a first packet to be transmitted to a second device, wherein the first packet includes information for a ROHC decompressor to establish a ROHC context, wherein the information enables the ROHC decompressor to decompress a second packet compressed by the ROHC compressor when operating in a second state;
    determining, at a sublayer or a layer lower than the ROHC sublayer, whether the first packet has been successfully received at the second device, wherein determining whether the first packet has been successfully received at the second device includes determining whether the first packet has been discarded at a packet data convergence protocol (PDCP) layer at the first device during operation of the ROHC compressor in the first state; and
    operating the ROHC compressor in the second state to compress the second packet to be transmitted to the second device in response to a determination that the first packet has been successfully received at the second device such that the first packet has not been discarded at the PDCP layer at the first device.

2. The method of claim 1, further comprising continuing operating the ROHC compressor in the first state in response to a determination that the first packet has not been successfully received at the second device.

3. The method of claim 1, wherein the first state is an initialization and refresh (IR) state, and wherein the second state is a first order (FO) state or a second order (SO) state.

4. The method of claim 1, wherein the ROHC context is one of a static context or a full context.

5. The method of claim 1, wherein the first packet is determined to have not been successfully received at the second device when the first packet has been discarded at the PDCP layer at the first device.

6. The method of claim 1, wherein the first packet is determined to have not been successfully received at the second device when the first packet has not been packaged at a radio link control (RLC) layer into a RLC protocol data unit (PDU) and then delivered to a media access control (MAC) layer.

7. The method of claim 6, further comprising operating the RLC layer in an unacknowledged mode.

8. The method of claim 1, wherein the ROHC compressor operates in a unidirectional mode, a bidirectional optimistic mode, or a bidirectional reliable mode.

9. The method of claim 1, wherein the first device is a user equipment (UE) or a base station.

10. An apparatus for wireless communication, the apparatus being a first device, comprising:
means for operating a robust header compression (ROHC) compressor in a first state at a ROHC sublayer to compress a first packet to be transmitted to a second device, wherein the first packet includes information for a ROHC decompressor to establish a ROHC context, wherein the information enables the ROHC decompressor to decompress a second packet compressed by the ROHC compressor when operating in a second state;
means for determining, at a sublayer or a layer lower than the ROHC sublayer, whether the first packet has been successfully received at the second device, wherein determining whether the first packet has been successfully received at the second device includes determining whether the first packet has been discarded at a packet data convergence protocol (PDCP) layer at the first device during operation of the ROHC compressor in the first state; and
means for operating the ROHC compressor in the second state to compress the second packet to be transmitted to the second device in response to a determination that the first packet has been successfully received at the second device such that the first packet has not been discarded at the PDCP layer at the first device.

11. The apparatus of claim 10, further comprising means for continuing operating the ROHC compressor in the first state in response to a determination that the first packet has not been successfully received at the second device.

12. The apparatus of claim 10, wherein the first state is an initialization and refresh (IR) state, and wherein the second state is a first order (FO) state or a second order (SO) state.

13. The apparatus of claim 10, wherein the ROHC context is one of a static context or a full context.

14. The apparatus of claim 10, wherein the first packet is determined to have not been successfully received at the second device when the first packet has been discarded at the PDCP layer at the first device.

15. The apparatus of claim 10, wherein the first packet is determined to have not been successfully received at the second device when the first packet has not been packaged at a radio link control (RLC) layer into a RLC protocol data unit (PDU) and then delivered to a media access control (MAC) layer.

16. The apparatus of claim 15, further comprising means for operating the RLC layer in an unacknowledged mode.

17. The apparatus of claim 10, wherein the ROHC compressor is configured to operate in a unidirectional mode, a bidirectional optimistic mode, or a bidirectional reliable mode.

18. The apparatus of claim 10, wherein the first device is a user equipment (UE) or a base station.

19. An apparatus for wireless communication, the apparatus being a first device, comprising:
a memory; and
at least one processor coupled to the memory and configured to:
operate a robust header compression (ROHC) compressor in a first state at a ROHC sublayer to compress a first packet to be transmitted to a second device, wherein the first packet includes information for a ROHC decompressor to establish a ROHC context, wherein the information enables the ROHC decompressor to decompress a second packet compressed by the ROHC compressor when operating in a second state;
determine, at a sublayer or a layer lower than the ROHC sublayer, whether the first packet has been successfully received at the second device, wherein determining whether the first packet has been successfully received at the second device includes determining whether the first packet has been discarded at a packet data convergence protocol (PDCP) layer at the first device during operation of the ROHC compressor in the first state; and
operate the ROHC compressor in the second state to compress the second packet to be transmitted to the second device in response to a determination that the first packet has been successfully received at the second device such that the first packet has not been discarded at the PDCP layer at the first device.

20. The apparatus of claim 19, wherein the at least one processor is further configured to continue operating the ROHC compressor in the first state in response to a determination that the first packet has not been successfully received at the second device.

21. The apparatus of claim 19, wherein the first state is an initialization and refresh (IR) state, and wherein the second state is a first order (FO) state or a second order (SO) state.

22. The apparatus of claim 19, wherein the ROHC context is one of a static context or a full context.

23. The apparatus of claim 19, wherein the first packet is determined to have not been successfully received at the second device when the first packet has been discarded at a the PDCP layer at the first device.

24. The apparatus of claim 19, wherein the first packet is determined to have not been successfully received at the second device when the first packet has not been packaged at a radio link control (RLC) layer into a RLC protocol data unit (PDU) and then delivered to a media access control (MAC) layer.

25. The apparatus of claim 24, wherein the at least one processor is further configured to operate the RLC layer in an unacknowledged mode.

26. The apparatus of claim 19, wherein the ROHC compressor is configured to operate in a unidirectional mode, a bidirectional optimistic mode, or a bidirectional reliable mode.

27. The apparatus of claim 19, wherein the first device is a user equipment (UE) or a base station.

28. A computer-readable medium storing computer executable code for wireless communication at a first device, comprising code for:

operating a robust header compression (ROHC) compressor in a first state at a ROHC sublayer to compress a first packet to be transmitted to a second device, wherein the first packet includes information for a ROHC decompressor to establish a ROHC context, wherein the information enables the ROHC decompressor to decompress a second packet compressed by the ROHC compressor when operating in a second state;

determining, at a sublayer or a layer lower than the ROHC sublayer, whether the first packet has been successfully received at the second device, wherein determining whether the first packet has been successfully received at the second device includes determining whether the first packet has been discarded at a packet data convergence protocol (PDCP) layer at the first device during operation of the ROHC compressor in the first state; and operating the ROHC compressor in the second state to compress the second packet to be transmitted to the second device in response to a determination that the first packet has been successfully received at the second device such that the first packet has not been discarded at the PDCP layer at the first device.

29. The computer-readable medium of claim 28, further comprising code for continuing operating the ROHC compressor in the first state in response to a determination that the first packet has not been successfully received at the second device.

30. The computer-readable medium of claim 28, wherein the first state is an initialization and refresh (IR) state, wherein the second state is a first order (FO) state or a second order (SO) state, and wherein the ROHC context is one of a static context or a full context.

\* \* \* \* \*